(12) United States Patent
McGrath (10) Patent No.: US 12,071,975 B2
(45) Date of Patent: Aug. 27, 2024

(54) BRACKET ASSEMBLY

(71) Applicant: ADVANCED DESIGN MFG LLC, Antioch, CA (US)

(72) Inventor: Andrew Hascall McGrath, Lafayette, CA (US)

(73) Assignee: ADVANCED DESIGN MFG LLC, Antioch, CA (US)

(*) Notice: Subject to any disclaimer, the term of this patent is extended or adjusted under 35 U.S.C. 154(b) by 50 days.

(21) Appl. No.: 17/985,472

(22) Filed: Nov. 11, 2022

(65) Prior Publication Data

US 2024/0159261 A1 May 16, 2024

(51) Int. Cl.
| F16M 13/02 | (2006.01) |
| A47F 10/06 | (2006.01) |
| F16B 5/06 | (2006.01) |
| E05D 3/02 | (2006.01) |

(52) U.S. Cl.
CPC ............ *F16B 5/0614* (2013.01); *A47F 10/06* (2013.01); *E05D 3/02* (2013.01); *F16B 2005/0678* (2013.01); *F16M 13/022* (2013.01)

(58) Field of Classification Search
CPC .. F16B 5/0614; F16B 2005/0678; F16B 5/06; A47F 10/06; A47F 3/12; A47F 9/00; A47B 96/06; E05D 3/02

See application file for complete search history.

(56) References Cited

U.S. PATENT DOCUMENTS

| 2010/0045149 | A1* | 2/2010 | English | A47B 96/062 |
| | | | | 312/140.4 |
| 2011/0080075 | A1* | 4/2011 | Matus, Jr. | A47F 10/06 |
| | | | | 312/140.4 |
| 2012/0200207 | A1* | 8/2012 | Atkins | A47F 10/06 |
| | | | | 312/137 |
| 2019/0110614 | A1* | 4/2019 | Charlier | A47F 10/06 |
| 2020/0187679 | A1* | 6/2020 | Quinter | A47F 10/06 |
| 2022/0125973 | A1* | 4/2022 | Woods | A61L 2/24 |
| 2022/0175157 | A1* | 6/2022 | Matus, Jr. | E05D 5/06 |

* cited by examiner

*Primary Examiner* — Tan Le (74) *Attorney, Agent, or Firm* — Quarles & Brady, LLP (57) ABSTRACT

A bracket clip assembly includes a bracket base and a bracket cap. The bracket base has a first base end, a second base end opposite the first base end, and a base slot extending into the second base end toward the first base end that is configured to slidably receive a first structural member. The bracket cap has a first cap end and a second cap end opposite the first cap end. The second cap end of the bracket cap is configured to be removably secured to the first base end of the bracket base to secure a second structural member between the bracket base and the bracket cap.

18 Claims, 7 Drawing Sheets

BRACKET ASSEMBLY

CROSS-REFERENCES TO RELATED APPLICATIONS

Not Applicable.

STATEMENT REGARDING FEDERALLY SPONSORED RESEARCH

Not Applicable.

BACKGROUND

Support structures, in particular support structure assemblies that are readily disassembled and reassembled, commonly utilize one or more brackets to removably secure two or more structural members of the assembly together.

BRIEF SUMMARY

In one aspect, the present disclosure provides a bracket assembly, in particular a bracket clip assembly, that can include a bracket base and a bracket cap. The bracket base can have a first base end, a second base end opposite the first base end, and a base slot extending into the second base end toward the first base end that is configured to slidably receive a first structural member. The bracket cap can have a first cap end and a second cap end opposite the first cap end. The second cap end of the bracket cap can be configured to be removably secured to the first base end of the bracket base to secure a second structural member between the bracket base and the bracket cap.

In some aspects, the first base end of the bracket base can be configured to threadably engage the second cap end of the bracket cap to removably secure the bracket cap to the bracket base.

In some aspects, the bracket base can further include a base protrusion extending outwardly from the first base end away from the second base end, the bracket cap can further include a cap protrusion extending outwardly from the second cap end away from the first cap end, and the cap protrusion of the second cap end of the bracket cap can be removably secured to the base protrusion of the first base end of the bracket base. In some aspects, the cap protrusion can have a similar shape as the base protrusion. In some aspects, the cap protrusion and the base protrusion can be cylindrical shaped. In some aspects, the cap protrusion and the base protrusion can have equal diameters.

In some aspects, the base slot can include a first slot surface disposed between the first and second base ends of the bracket base, a second slot surface extending from the first slot surface to the second base end, and a third slot surface extending from the first slot surface to the second base end opposite the second slot surface. In some aspects, the first slot surface can be disposed closer to the first base end than the second base end. In some aspects, the first slot surface can extend substantially parallel to at least the first base end of the bracket base. In some aspects, the second and third slot surfaces can be substantially parallel. In some aspects, the bracket base can include a base opening that can extend into the first slot surface and through the second base end, the bracket cap can include a cap opening that can extend into the second cap end toward the first cap end, and the base opening and the cap opening can be axially aligned. In some aspects, the bracket clip assembly can further include a first fastener that can be configured to be inserted into the base slot and can engage the base opening and the cap opening to secure the bracket cap to the bracket base.

In some aspects, the bracket base can include a base aperture that can extend through a side of the bracket base between the first and second base ends and into the base slot. In some aspects, the bracket clip assembly can further include a second fastener that can be configured to engage the base aperture to secure the first structural member within the base slot of the bracket base.

In some aspects, the present disclosure provides a bracket clip assembly that can include a bracket base, a bracket cap, a first fastener, and a second fastener. The bracket base can have a first base end, a second base end opposite the first base end, a first base side extending between the first and second base ends, a second base side extending between the first and second base ends opposite the first base side, a base slot, and a base protrusion. The base slot of the bracket base can extend into the second base end toward the first base end and through at least one of the first and second base sides and can be configured to slidably receive a first structural member. The base protrusion of the bracket base can extend outwardly from the first base end away from the second base end. The bracket cap can include a first cap end, a second cap end opposite the first cap end, and a cap protrusion. The cap protrusion of the bracket cap can extend outwardly from the second cap end away from the first cap end and can be configured to be removably secured to the base protrusion of the bracket base. The first fastener can be configured to threadably engage the bracket base and the bracket cap to removably secure the bracket cap to the bracket base. The second fastener can be configured to fixedly secure the first structural member within the base slot of the bracket base. The base protrusion of the bracket base and the cap protrusion of the bracket cap can be configured to secure a second structural member to the bracket clip assembly between the bracket base and the bracket cap.

In some aspects, the bracket base can further include a base opening that can extend through the base slot and the base protrusion, the bracket cap can further include a cap opening that can extend into the cap protrusion toward the first cap end, and the first fastener can threadably engage the base opening of the bracket base and the cap opening of the bracket cap to removably secure the cap protrusion of the bracket cap to the base protrusion of the bracket base.

In some aspects, the cap protrusion and the base protrusion can be cylindrical shaped and can have an equal diameter.

In some aspects, the bracket base can further include a base aperture extending through the first base side and into the base slot, and the second fastener can threadably engage the base aperture of the bracket base to fixedly secure the first structural member within the base slot of the bracket base.

In some aspects, the present disclosure provides a method for assembling a bracket clip assembly of a structural assembly. The method can include inserting a base protrusion of a bracket base of the bracket clip assembly and a cap protrusion of a bracket cap of the bracket clip assembly into opposing sides of an opening of a first structural member of the structural assembly, and securing the cap protrusion of the bracket cap to the base protrusion of the bracket base to secure the bracket clip assembly to the first structural member. The method can further include inserting an outer edge of a second structural member of the structural assembly into a bracket slot of the bracket base, and securing the second structural member of the structural assembly within the bracket slot of the bracket base.

In some aspects, a method for assembling a bracket clip assembly of a structural assembly can provide the bracket clip assembly securing the first structural member of the structural assembly substantially perpendicular relative to the second structural member of the structural assembly.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTION OF DRAWINGS

The present disclosure will be better understood and features, aspects and advantages other than those set forth above will become apparent when consideration is given to the following detailed description thereof. Such detailed description makes reference to the following drawings.

DETAILED DESCRIPTION

Before any aspects of the present disclosure are explained in detail, it is to be understood that the present disclosure is not limited in its application to the details of construction and the arrangement of components set forth in the following description or illustrated in the following drawings. The present disclosure is capable of other configurations and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise limited or defined, "integral" and derivatives thereof (e.g., "integrally") describe elements that are manufactured as a single, unitary piece without fasteners, adhesive, or the like to secure separate components together. For example, an element stamped, cast, or otherwise molded as a single-piece component from a single piece of sheet metal or using a single mold, without rivets, screws, or adhesive to hold separately formed pieces together is an integral (and integrally formed) element. In contrast, an element formed from multiple pieces that are separately formed initially then later connected together, is not an integral (or integrally formed) element.

Also as used herein, unless otherwise limited or defined, "substantially parallel" indicates a direction that is within plus or minus 8 degrees of a reference direction (e.g., within plus or minus 5 degrees), inclusive. For a path that is not linear, the path can be considered to be substantially parallel to a reference direction if a straight line between end-points of the path is substantially parallel to the reference direction or a mean derivative of the path within a common reference frame as the reference direction is substantially parallel to the reference direction.

Similarly, as used herein, unless otherwise limited or defined, "substantially perpendicular" indicates a direction that is within plus or minus 8 degrees of perpendicular a reference direction (e.g., within plus or minus 5 degrees), inclusive. For a path that is not linear, the path can be considered to be substantially perpendicular to a reference direction if a straight line between end-points of the path is substantially perpendicular to the reference direction or a mean derivative of the path within a common reference frame as the reference direction is substantially perpendicular to the reference direction.

The following discussion is presented to enable a person skilled in the art to make and use aspects of the present disclosure. Various modifications to the illustrated configurations will be readily apparent to those skilled in the art, and the generic principles herein can be applied to other configurations and applications without departing from aspects of the present disclosure. Thus, aspects of the present disclosure are not intended to be limited to configurations shown, but are to be accorded the widest scope consistent with the principles and features disclosed herein. The following detailed description is to be read with reference to the figures, in which like elements in different figures have like reference numerals. The figures, which are not necessarily to scale, depict selected configurations and are not intended to limit the scope of the present disclosure. Skilled artisans will recognize the non-limiting examples provided herein have many useful alternatives and fall within the scope of the present disclosure.

It should be appreciated that bracket clips and structural assemblies are designed in a variety of configurations. It will be apparent to those of skill in the art that the present disclosure may be provided for bracket clip assemblies to couple together one or more structural members of a structural assembly. Further, the present disclosure is not limited to bracket clip assemblies for structural assemblies. Rather, the present disclosure may be provided for other types of devices for coupling components together or other types of structural assemblies.

Structural assemblies generally include permanently assembled structural assemblies, which remain assembled throughout the lifecycle of the assembly, and temporary or adjustable structural assemblies, which can be assembled and disassembled numerous times and can provide means to adjust or customize particular aspects or configurations of the assembly. Regarding the latter type of structural assemblies, brackets of various types are commonly utilized to couple and secure structural members of the structural assembly together during assembly and that are later unfastened during disassembly. However, conventional structural assemblies commonly require fasteners of such brackets to be fastened directly to two or more structural members. Thus, repeated assembly and disassembly of the structural assembly can lead to fastener holes of the structural members being stripped or unusable with the fasteners of the brackets. Further, in such conventional structural assemblies, positions of one or more of the structural members may not be easily adjustable relative to other structural members. For example, a user may need to use tools to create new fastener holes on one or more structural members to couple a particular structural member at a customized position.

Generally, the present disclosure provides a bracket clip assembly for a structural assembly that enables two or more structural members of a structural assembly to be coupled together without requiring fasteners that fasten directly to the structural members. For example, in some non-limiting examples, the bracket clip assembly can include a bracket base and a bracket clip that are secured on opposing sides of an opening in a first structural member to secure the bracket clip assembly to the first structural member. Further, the bracket base of the bracket clip assembly can include a slot that can slidably receive an edge of a second structural member to secure the bracket clip assembly to the second structural member, thus coupling together the first and second structural members. In addition, in such non-limiting examples, the position of the second structural member relative to the first structural member or the bracket clip assembly can be easily adjustable by a user during or after assembly of the structural assembly.

Figure 1:
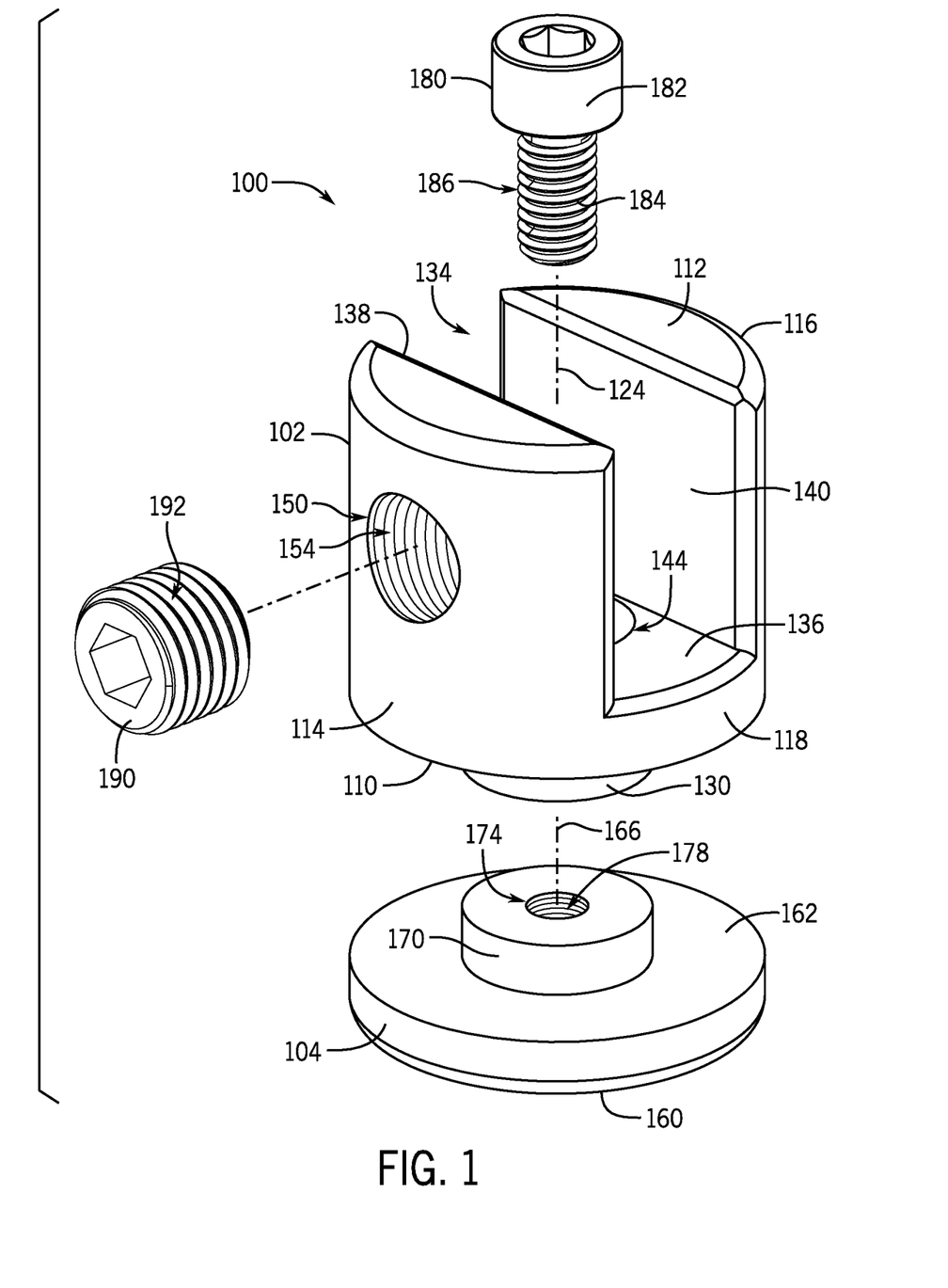
FIG. 1 illustrates a front-left-top side isometric view of an exemplary bracket clip assembly in an exploded configuration according to some aspects of the present disclosure.

Turning now to FIG. 1, a non-limiting example bracket clip assembly 100 is shown in an exploded configuration. The bracket clip assembly 100 includes a bracket base 102 and a bracket cap 104 that is removably attachable to the bracket base 102. In some non-limiting examples, the bracket clip assembly 100 can include one or more components in addition to the bracket base 102 and the bracket cap 104 as illustrated in FIG. 1.

Figure 2:
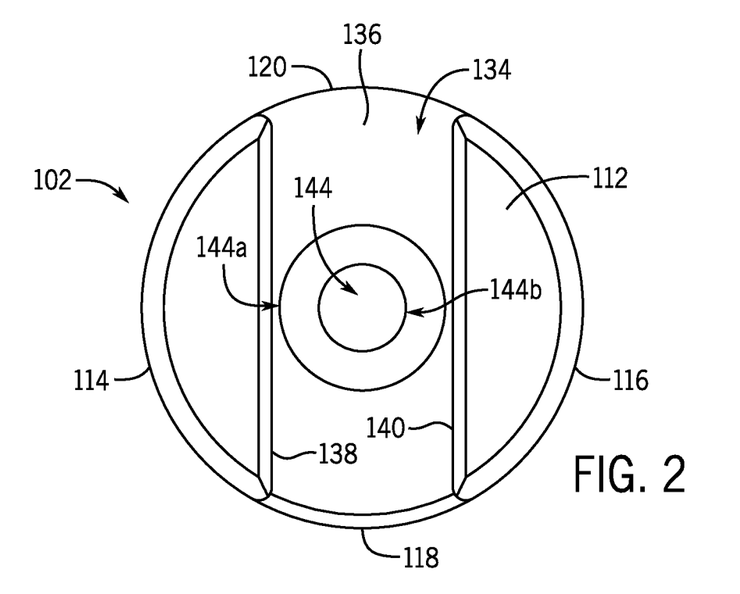
FIG. 2 illustrates a top planar view of a bracket base of the bracket clip assembly of FIG. 1.
Figure 3:
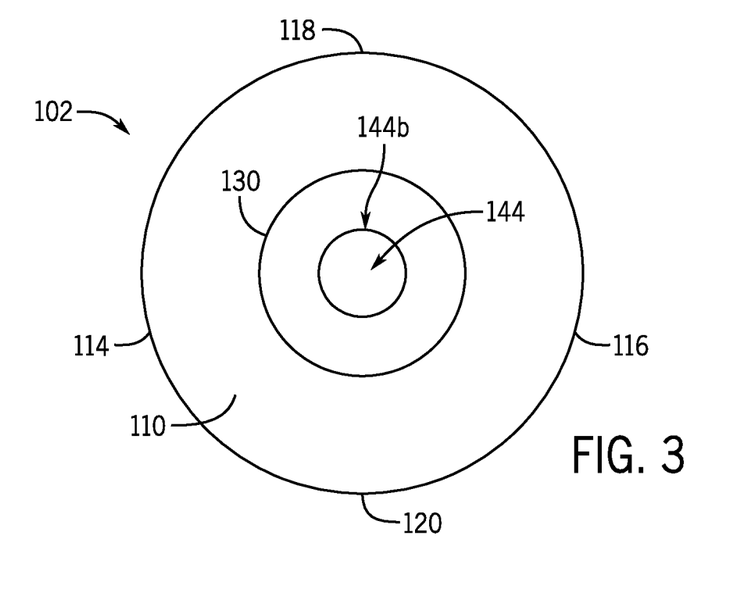
FIG. 3 illustrates a bottom planar view of the bracket base of FIG. 2.

Referring to FIGS. 1-3, the bracket base 102 has a first or inner end 110, a second or outer end 112 opposite the inner end 110, a first or left side 114 extending between the inner and outer ends 110, 112, a second or right side 116 opposite the left side 114, a third or front side 118 extending between the inner and outer ends 110, 112 adjacent to both the left and right sides 114, 116, and a fourth or rear side 120 (see FIGS. 2 and 3) opposite the front side 118. In the illustrated non-limiting example, the sides 114, 116, 118, 120 of the bracket base 102 define an axial profile of the bracket base 102 that is generally circular shaped such that bracket base 102 is generally cylindrical with a base longitudinal axis 124 (see FIG. 1) extending through the inner and outer ends 110, 112 of the bracket base 102. In some non-limiting examples, the bracket base 102 can have more or less than four sides or can have an axial profile having a different shape than that shown in the illustrated non-limiting example. For example, the axial profile of the bracket base 102 can be one of a variety of polygonal shapes (such as, e.g., squared, rectangular, triangular, quadrilateral, pentagonal, etc.) or non-polygonal shapes (such as, e.g., oval or irregular).

The bracket base 102 can have a base protrusion 130 extending outwardly and downwardly from the inner end 110 away from the outer end 112. In the illustrated non-limiting example, and with reference specifically to FIG. 3, the base protrusion 130 has an axial profile that has a generally circular shape similar to profile defined by the sides 114, 116, 118, 120 of the bracket base 102 but having a diameter that is less than that of the bracket base 102. In some non-limiting examples, the diameter of the base protrusion 130 can be greater than that of the bracket base 102. In some non-limiting examples, the base protrusion 130 can have an axial profile with a shape that is different than that of the bracket base 102. For example, in some non-limiting examples, the bracket base 102 can have an axial profile that is square shaped while the base protrusion 130 can have an axial profile that is circular shaped, or vice versa.

In the illustrated non-limiting example, the base protrusion 130 extends outwardly from the inner end 110 of the bracket base 102 and aligned with the base longitudinal axis 124. In some non-limiting examples, the base protrusion 130 can be misaligned relative to the base longitudinal axis 124. In some non-limiting examples, the bracket base 102 can include a plurality of base protrusions extending from one or more side 114, 116, 118, 120 or the upper end 112.

Referring still to FIGS. 1-3, the bracket base 102 also has a base slot 134 extending through the outer end 112 and at least toward the inner end 110 and through the front and rear sides 118, 120. The base slot 134 has a first or inner slot surface 136 disposed between the inner and outer ends 110, 112, a second or left side slot surface 138 extending from the inner slot surface 136 to the outer end 112, and a third or right side slot surface 140 extending opposite the left side slot surface 138. In the illustrated non-limiting example, the inner slot surface 136 extends substantially parallel to the inner and outer ends 110, 112 of the bracket base 102 and substantially perpendicular to the left and right side slot surfaces 138, 140 such that the base slot 134 has a generally uniform thickness measured between the left and right side slot surfaces 138, 140. In some non-limiting examples, the inner slot surface 136 can extend substantially parallel to at least the inner end 110 of the bracket base 102. In some non-limiting examples, the inner slot surface 136 can extend at an angle relative to at least the inner end 110 of the bracket base 102. In some non-limiting examples, one or both of the left and right side slot surfaces 138, 140 can extend obliquely relative to the inner slot surface 136. In some non-limiting examples, the bracket base 102 can include two or more base slots.

In the illustrated non-limiting example, the inner slot surface 136 of the base slot 134 of the bracket base 102 is disposed along the base longitudinal axis 124 closer to the inner end 110 than the outer end 112 of the bracket base 102. In some non-limiting examples, the inner slot surface 136 of the base slot 134 can be disposed closer to the outer end 112 than the inner end 110 of the bracket base 102. In some non-limiting examples, the inner slot surface 136 of the base slot 134 can be disposed at a substantially equal distance from the inner and outer ends 110, 112 of the bracket base 102.

In some non-limiting examples, the base slot 134 of the bracket base 102 can be configured to slidably receive an outer edge of a structural member (see FIGS. 8-9) of a structural assembly. For example, in such non-limiting examples, an outer edge of a structural member can be received within the base slot 134 and can contact one or more of: the inner slot surface 136, the left side slot surface 138, or the right side slot surface 140 of the base slot 134. In some non-limiting examples, at least a portion of the bracket base 102 (e.g., a portion adjacent to the outer end 112) can be comprised of a material having elastomeric properties such that the left and right sides 114, 116 of the bracket base 102 adjacent to the left and right side slot surfaces 138, 140 of the base slot 134 can elastically deform to receive the structural member and then can exert an elastic clamping force on the structural member to secure the structural member within the base slot 134. In some non-limiting examples, one or more magnets can be integrally formed with one or more of the slot surfaces 136, 138, 140 to magnetically secure a structural member within the base slot 134.

Figure 6:
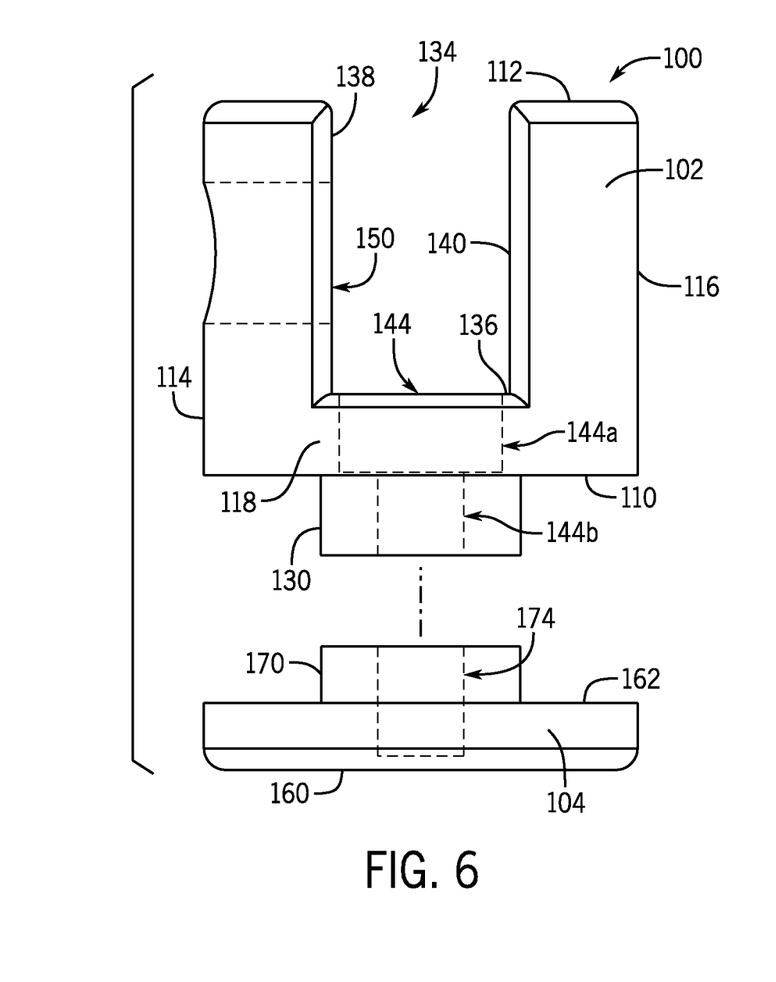
FIG. 6 illustrates a front side view of the bracket base and the bracket cap of FIG. 1.

With continued reference to FIGS. 1-3, a base opening 144 of the bracket base 102 can extend through each of: the inner slot surface 136 of the base slot 134 of the bracket base 102; the inner end 110 of the bracket base 102; and the base protrusion 130 of the bracket base 102. As shown in FIG. 6, in the illustrated non-limiting example, the base opening 144 is substantially aligned with the base longitudinal axis 124, and thus is also aligned with the base protrusion 130. In some non-limiting examples, the base opening 144 can be off centered from one or more of the base longitudinal axis 124 or the base protrusion 130.

Figure 7:
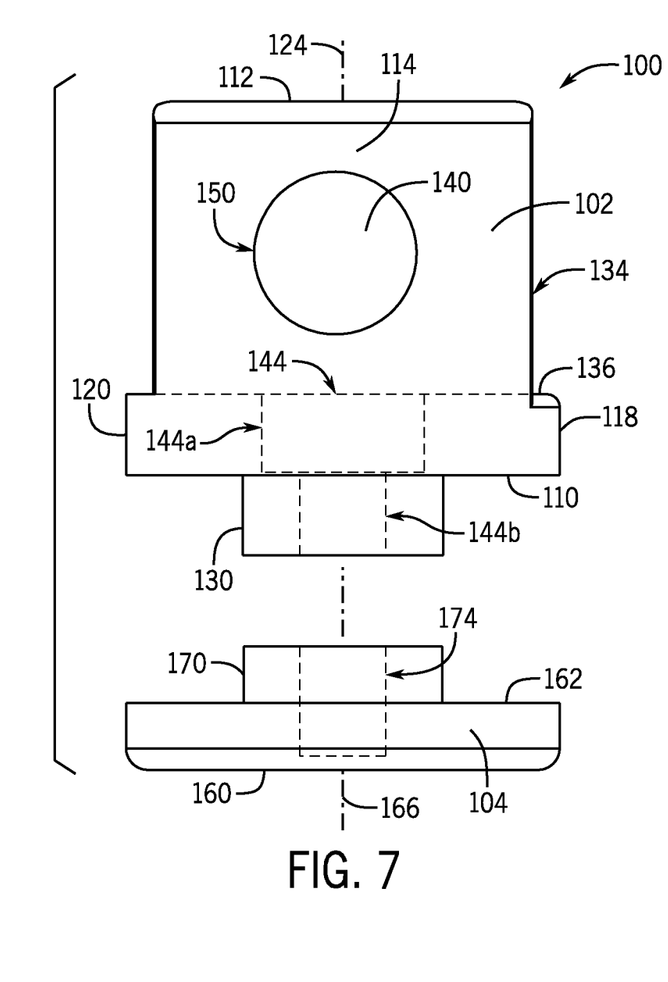
FIG. 7 illustrates a left side view of the bracket base and the bracket cap of FIG. 1.

Referring specifically to FIGS. 2, 6, and 7, in the illustrated non-limiting example, the base opening 144 is a counterbore hole having a first base opening 144a extending through the inner slot surface 136 and a second base opening 144b extending from the first base opening 144a through the inner end 110 and the base protrusion 130. Further, the first base opening 144a has a diameter that is greater than that of the second base opening 144b. In some non-limiting examples, the base opening 144 can have a uniform diameter. In the illustrated non-limiting example, the base opening 144 has a first plurality of threads 148 (see FIG. 9). More specifically, the second base opening 144b of the base opening 144 has the first plurality of threads 148.

Referring to FIGS. 1, 6, and 7, a base aperture 150 of the bracket base 102 can extend through both the left side 114 and the left slot surface 138 into the base slot 134. In the illustrated non-limiting example, a second plurality of threads 154 (see FIG. 1) is included in the base aperture 150. In some non-limiting examples, the base aperture 150 can extend through both the left and right sides 114, 116 of the bracket cap 104 and thus also the left and right side slot surfaces 138, 140 of the base slot 134.

Figure 4:
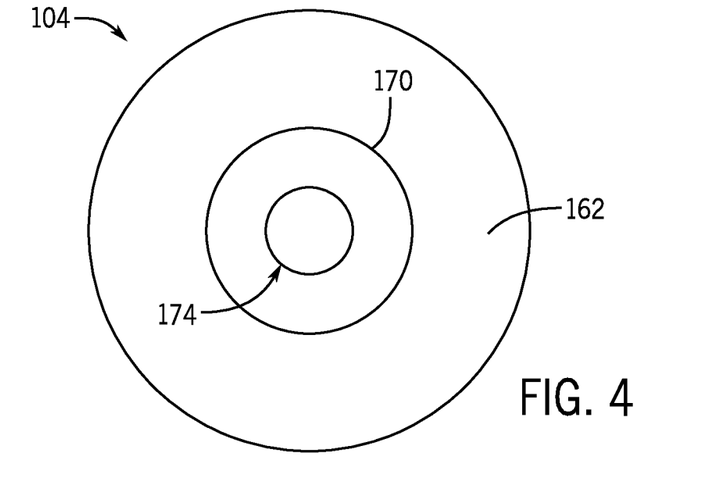
FIG. 4 illustrates a top planar view of a bracket cap of the bracket clip assembly of FIG. 1.
Figure 5:
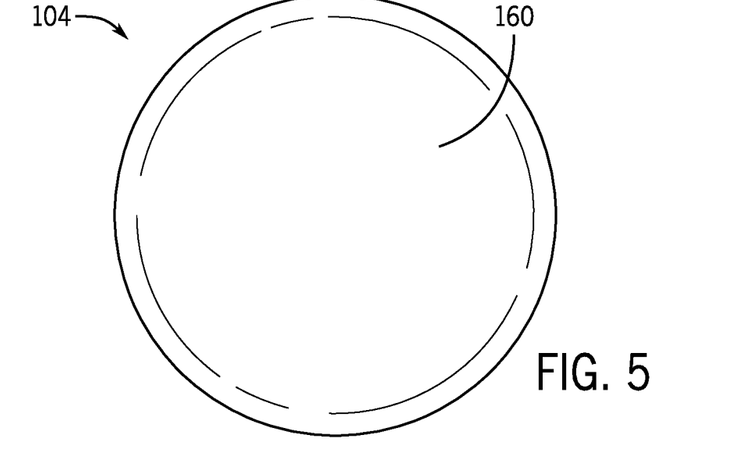
FIG. 5 illustrates a bottom planar view of the bracket cap of FIG. 4.

Referring now to FIGS. 1, 4, and 5, the bracket cap 104 can have a first or outer end 160 and a second or inner end 162 opposite the outer end 160. In the illustrated non-limiting example, the bracket cap 104 has an axial profile that is generally circular shaped such that bracket cap 104 is generally cylindrical shaped with a cap longitudinal axis 166 (see FIG. 1) extending through the outer and inner ends 160, 162 of the bracket cap 104. In some non-limiting examples, the bracket cap 104 can have an axial profile having a different shape than that shown in the illustrated non-limiting example. For example, the axial profile of the bracket cap 104 can be one of a variety of polygonal shapes (such as, e.g., square, rectangular, triangular, quadrilateral, pentagonal, etc.) or non-polygonal shapes (such as, e.g., oval or irregular).

In the illustrated non-limiting example, the bracket cap 104 has a circular shaped axial profile that is generally similar to that of the bracket base 102. Further, the bracket cap 104 has a diameter that is substantially equal to that of the bracket base 102. In some non-limiting examples, the diameter of the bracket cap 104 can be greater than that of the bracket base 102. In some non-limiting examples, the bracket cap 104 can have an axial profile with a shape that is different than that of the bracket base 102. For example, in some non-limiting examples, the bracket base 102 can have an axial profile that is square shaped while the bracket cap 104 can have an axial profile that is circular shaped, or vice versa.

A cap protrusion 170 extends outwardly and upwardly from the inner end 162 of the bracket cap 104 and away from the outer end 160 of the bracket cap 104. In the illustrated non-limiting example, and with reference specifically to FIG. 4, the cap protrusion 170 has an axial profile that has a generally circular shape similar to the axial profile of the bracket cap 104 but having a diameter that is less than that of the bracket cap 104. In some non-limiting examples, the diameter of the cap protrusion 170 can be greater than that of the bracket cap 104. In some non-limiting examples, the cap protrusion 170 can have an axial profile with a shape that is different than that of the bracket cap 104. For example, in some non-limiting examples, the bracket cap 104 can have an axial profile that is square shaped while the cap protrusion 170 can have an axial profile that is circular shaped, or vice versa.

In the illustrated non-limiting example, the cap protrusion 170 extends outwardly and upwardly from the inner end 162 of the bracket cap 104 and aligned with the cap longitudinal axis 166. In some non-limiting examples, the cap protrusion 170 can be misaligned relative to the cap longitudinal axis 166. In some non-limiting examples, the bracket cap 104 can include a plurality of cap protrusions extending from one or both of the outer and inner ends 160, 162.

Referring specifically to FIGS. 4, 6 and 7, in the illustrated non-limiting example, the cap protrusion 170 can have an axial profile is generally similar to the axial profile of the base protrusion 130 and has a diameter that is substantially equal to that of the base protrusion 130. In some non-limiting examples, the diameter of the cap protrusion 170 of the bracket cap 104 can be greater than that of the base protrusion 130 of the bracket base 102. In some non-limiting examples, the cap protrusion 170 of the bracket cap 104 can have an axial profile with a shape that is different than that of the base protrusion 130 of the bracket base 102. For example, in some non-limiting examples, the cap protrusion 170 can have an axial profile that is square shaped while the base protrusion 130 can have an axial profile that is circular shaped, or vice versa.

With continued reference to FIGS. 4, 6, and 7, a cap opening 174 of the bracket cap 104 extends through the cap protrusion 170 and the inner end 162 toward the outer end 162. The cap opening 174 has a third plurality of threads 178 (see FIG. 1) that can be similar to the first plurality of threads 148 of the base opening 144 (e.g., of the second base opening 144b). In the illustrated non-limiting example, the cap opening 174 is aligned with the cap longitudinal axis 166, and thus is also aligned with the cap protrusion 170. In some non-limiting examples, the cap opening 174 can be misaligned from one or more of the cap longitudinal axis 166 or the cap protrusion 170.

Referring to FIGS. 1, 6, and 7, the bracket cap 104 can be removably attached to the bracket base 102 via a first fastener 180 (see FIG. 1) of the bracket clip assembly 100. In particular, in the illustrated non-limiting example, the base protrusion 130 of the bracket base 102 can engage (e.g., threadably) the cap protrusion 170 of the bracket cap 104 to removably secure the inner end 162 of the bracket cap 104 with the inner end 110 of the bracket base 102. More specifically, with the cap longitudinal axis 166 of the bracket cap 104 aligned with the base longitudinal axis 124 of the bracket base 102 (and collectively defining a longitudinal axis of the bracket clip assembly 100), the base opening 144 of the bracket base 102 is aligned with the cap opening 174 of the bracket cap 104, such that the first fastener 180 can be inserted into the base slot 134 and received within both the base opening 144 on the inner slot surface 136 and the cap opening 174 of the bracket cap 104. Further, the first fastener 180 can be configured to threadably engage the first plurality of threads 148 of the base opening 144 (e.g., of the second base opening 144b) of the bracket base 102 and the third plurality of threads 178 of the cap opening 174 of the bracket cap 104 to threadably secure the bracket cap 104 to the bracket base 102. In some non-limiting examples, the first fastener 180 can be configured to threadably engage at least the third plurality of threads 178 of the cap opening 174 of the bracket cap 104.

Figure 9:
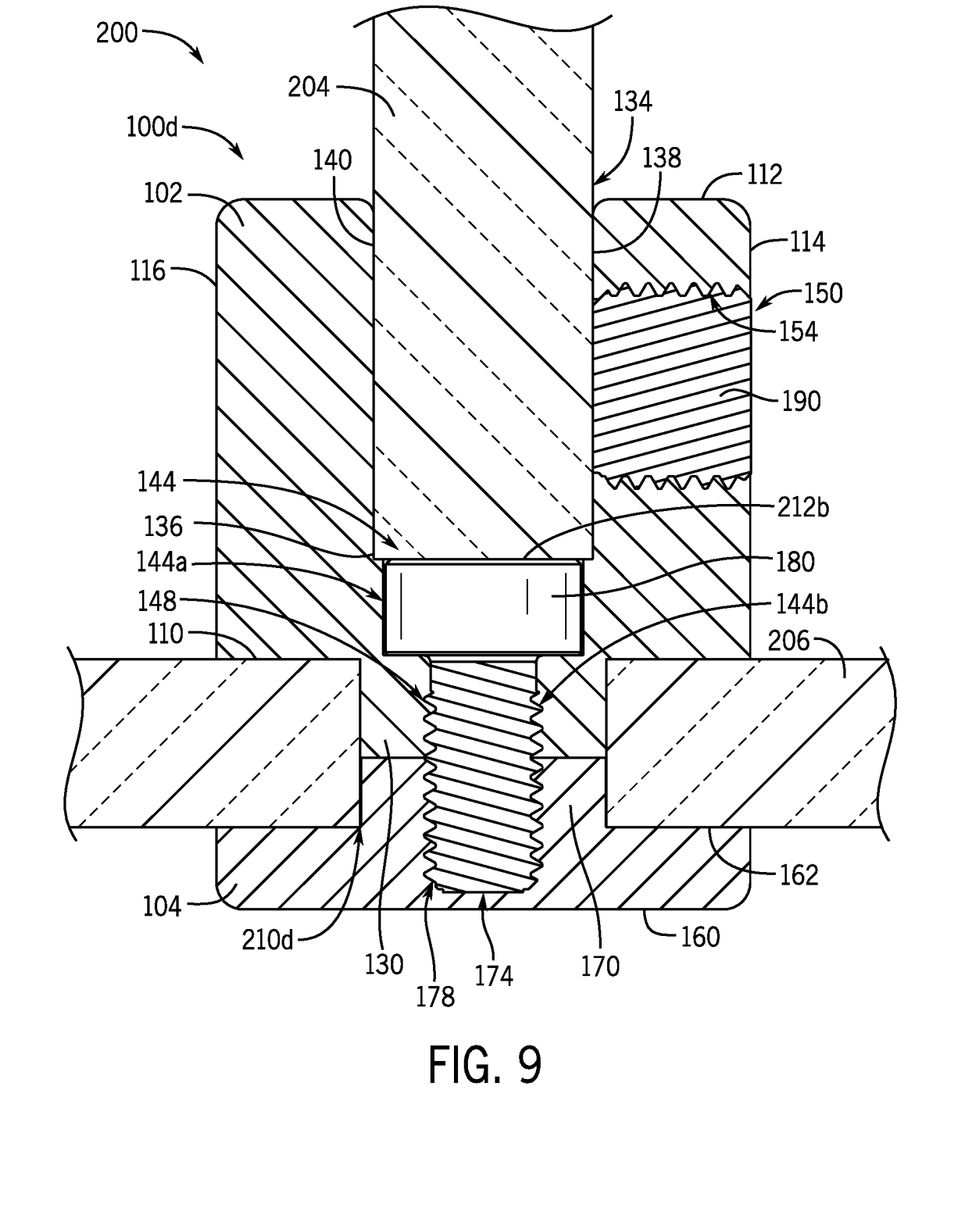
FIG. 9 illustrates a cross-sectional view taken along line 9-9 of FIG. 8.

For example, in the illustrated non-limiting example, and with reference specifically to FIG. 1, the first fastener 180 has a fastener head 182 and a fastener body 184 extending downwardly from the fastener head 182 and having a plurality of first fastener threads 186. Thus, when the first fastener 180 is received within the base opening 144 of the bracket base 102 and the cap opening 174 of the bracket cap 104, the plurality of first fastener threads 186 of the fastener body 184 threadably engage both the first plurality of threads 148 of the second base opening 144b of the base opening 144 and the third plurality of threads 178 of the cap opening 174 while the fastener head 182 is received within the first base opening 144a of the base opening 144. As shown in FIG. 9, the base opening 144 of the bracket base 102 is configured such that an outermost end of the fastener head 182 is disposed below or flush with the inner slot surface 136 of the base slot 134 when the first fastener 180 threadably secures the bracket cap 104 to the bracket body 102. In some non-limiting examples, the cap opening 174 of the bracket cap 104 can extend through the outer end 160 of the bracket cap 104 such that the first fastener 180 can be inserted into the cap opening 174 of the bracket cap 104 to threadably secure the bracket cap 104 to the bracket base 102.

Referring to FIGS. 1 and 6, the base aperture 150 of the bracket base 102 can receive a second fastener 190 of the bracket clip assembly 100. In the illustrated non-limiting example, the second fastener 190 is a set screw having a plurality of second fastener threads 192. Therefore, the second fastener 190 can be inserted into the base aperture 150 from the left side 114 of the bracket base 102 and the plurality of second fastener threads 192 can threadably engage the second plurality of threads 154 of the base aperture 150. Further, with the second fastener 190 being configured as a set screw, the second fastener 190 can be received at variable depths within the base aperture 150. For example, an innermost end of the second fastener 190 can be flush with, extend below, or extend past the left side slot surface 138 of the base slot 134.

In some non-limiting examples, the bracket base 102 and the bracket clip 104 can be comprised of a single material. In some non-limiting examples, the bracket base 102 can be comprised of a first material and the bracket cap 104 can be comprised of a second material having one or more properties that differ from the first material. In some non-limiting examples, the base protrusion 130 can be formed of a first material and one or more other portions of the bracket base 102 can be formed of a second material that differs from the first material. In some non-limiting examples, the cap protrusion 170 can be formed of a first material and one or more other portions of the bracket cap 104 can be formed of a second material that differs from the first material. In some non-limiting examples, one or more of the bracket base 102 or the bracket clip 104 of the bracket clip assembly 100 can formed of a material that is translucent or transparent. In some non-limiting examples, at least one or more of the base protrusion 130 of the bracket base 102 or the cap protrusion 170 of the bracket cap 104 can be formed of a material that is translucent or transparent.

As generally described herein, one or more bracket clip assemblies can be utilized to removably couple two or more structural members to form a structural assembly. By utilizing one or more bracket assemblies (such as, e.g., the bracket clip assembly 100 of FIGS. 1-9), a structural assembly can be easily assembled or disassembled by a user. Further, one or more structural members of the structural assembly may be easily repositioned during and after assembly of the structural assembly adjusting a position of the bracket clip assembly relative to a particular structural member of the structural assembly.

Figure 8:
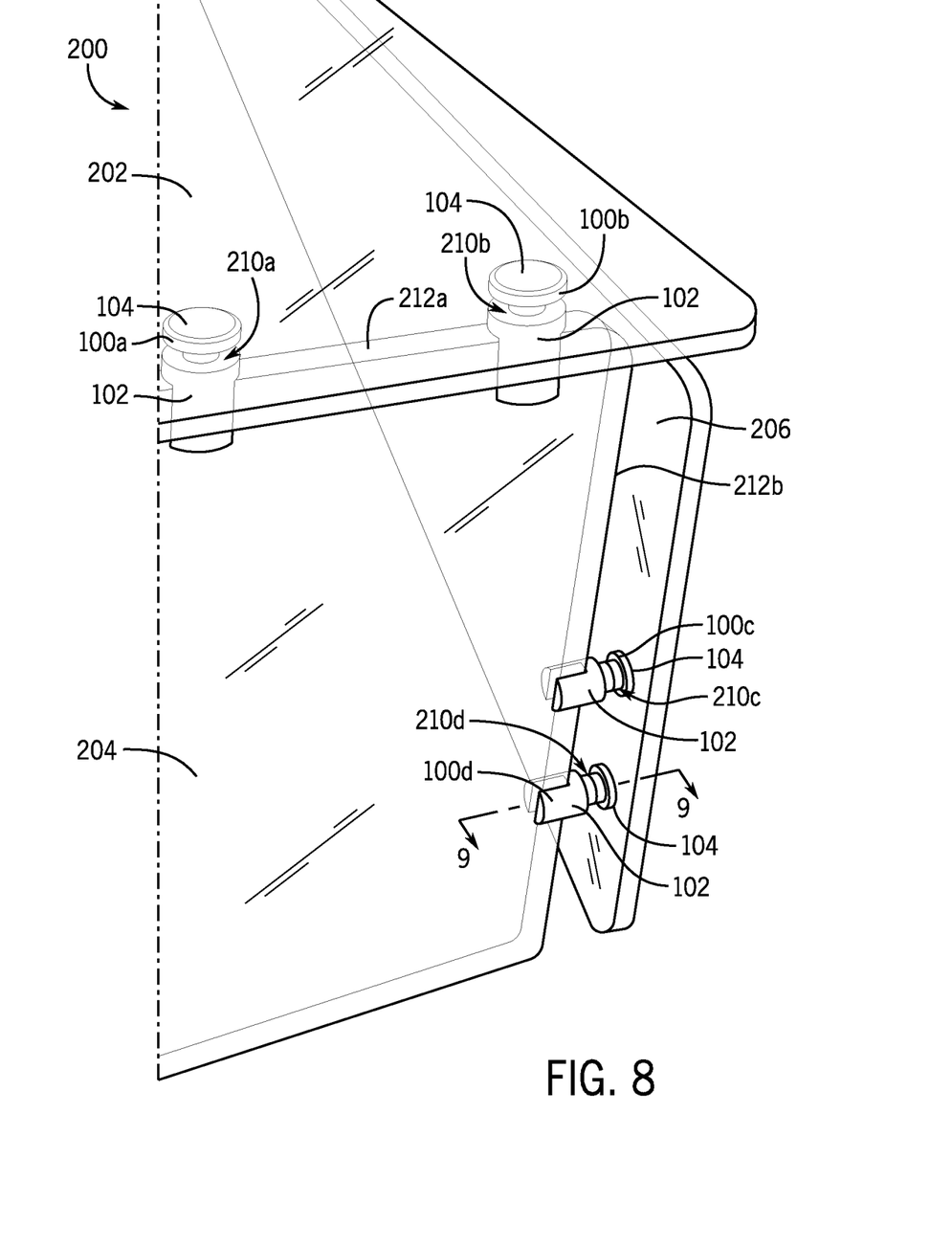
FIG. 8 illustrates a partial perspective view of an exemplary structural assembly according to some aspects of the present disclosure.

In that regard FIG. 8 illustrates an exemplary structural assembly 200 including at least a first structural member 202, a second structural member 204, and a third structural member 206. The structural assembly 200 further includes a first bracket clip assembly 100a, a second bracket clip assembly 100b, a third bracket clip assembly 100c, and a fourth bracket clip assembly 100d. The bracket clip assemblies 100a, 100b, 100c, 100d are generally similar to the bracket clip assembly 100 of FIGS. 1-7 and can be generally identical to one another. Therefore, like reference numerals are used to describe the bracket clip assemblies 100a, 100b, 100c, 100d of the structural assembly 200 of FIGS. 8 and 9 as the bracket clip assembly 100 of FIGS. 1-7.

In the illustrated non-limiting example, the structural members 202, 204, 206 of the structural assembly 200 can be panels having a uniform thickness. In some non-limiting examples, one or more of the structural members 202, 204, 206 can have a thickness that differs from that of one or more other structural members 202, 204, 206 of the structural assembly 200. In some non-limiting examples, one or more of the structural members 202, 204, 206 can be comprised of a translucent or transparent material (e.g., each of the structural members 202, 204, 206 being translucent as illustrated in FIG. 8).

Referring still to FIG. 8, the first structural member 202 is coupled to the second structural member 204 via the first and second bracket clip assemblies 100a, 100b. Similarly, the third structural member 206 is coupled to the second structural member 204 via the third and fourth bracket clip assemblies 100c, 100d. It should be appreciated that the structural assembly 200 can include four or more structural members, as well as three or less or five or more bracket clip assemblies. For example, in some non-limiting examples, the structural assembly 200 can include four structural members and at least four bracket assemblies.

The first structural member 202 has a first panel opening 210a and a second panel opening 210b that each extend through the first structural member 202. Likewise, the third structural member 206 has a third panel opening 210c and a fourth panel opening 210d that extend through the third structural member 206. The first and second panel openings 210a, 210b of the first structural member 202 are configured to fixedly receive the first and second bracket clip assemblies 100a, 100b, respectively, and the third and fourth panel openings 210c, 210d of the third structural member 206 are configured to slidably receive the third and fourth bracket clip assemblies 100c, 100d, respectively. Further, the first and second bracket clip assemblies 100a, 100b are each configured to slidably receive a first or upper edge 212a of the second structural member 204, and the third and fourth bracket clip assemblies 100c, 100d are each configured to slidably receive a second or side edge 212b of the second structural member 204 that is adjacent to the upper edge 212a.

FIG. 9 illustrates a cross-sectional view through the fourth bracket clip assembly 100d of the structural assembly 200. In the illustrated non-limiting example, the bracket base 102 is arranged on one side of the third structural member 206 and the bracket cap 104 is arranged on the other side of the third structural member 206 such that the fourth bracket clip assembly 100d is aligned with the fourth panel opening 210d. The base protrusion 130 of the bracket base 102 and the cap protrusion 170 of the bracket cap 104 of the of the fourth bracket clip assembly 100d are each received within the fourth panel opening 210d such that the inner end 110 of the bracket base 102 and the inner end 162 of the bracket cap 104 contact opposing sides of the third structural member 206 adjacent to the fourth panel opening 210. Further, the third structural member 206 of the structural assembly 200 is fixedly secured within the inner end 110 of the bracket base 102 and the inner end 162 of the bracket cap 104 via the first fastener 180 of the fourth bracket clip assembly 100d.

It should be appreciated that although the third structural member 206 is illustrated as having a thickness equal to a width measured between the inner end 110 of the bracket base 102 and the inner end 162 of the bracket cap 104, the fourth bracket clip assembly 100d can be configured to secure a structural member having a thickness greater than the width measured between the inner end 110 of the bracket base 102 and the inner end 162 of the bracket cap 104. For example, in some non-limiting examples, the outer ends of the base protrusion 130 and the cap protrusion 170 need not contact each other in order to adequately clamp the inner end 110 of the bracket base 102 and the inner end 162 of the bracket cap 104 on opposing sides of the third structural member 206. Thus, in such non-limiting examples, a gap can be formed between the base protrusion 130 and the cap protrusion 170 and a fastener similar to the first fastener 180 but having a greater length can extend between the gap and threadably fasten the bracket cap 104 to the bracket base 102.

In the illustrated non-limiting example, the fourth panel opening 210d is generally circular shaped to correspond to the cylindrically shaped base and cap protrusions 130, 170 of the fourth bracket clip assembly 100d. In some non-limiting examples, the fourth panel opening 210d can have a different shape than one or more of the base protrusion 130 or the cap protrusion 170. In some non-limiting examples, the fourth panel opening 210d can have a non-uniform shape. For example, in some non-limiting examples, the fourth panel opening 210d can have a first portion with a first shape configured to slidably receive the base protrusion 130 of the bracket base 102 and a second portion with a second shape, that differs from the first shape, configured to slidably receive the cap protrusion 170 of the bracket cap 104.

Referring still to FIG. 9, the base slot 134 of the bracket base 102 of the fourth bracket clip assembly 100d is configured to slidably receive the side edge 212b of the second structural member 204 such that the second structural member 204 contacts each of the slot surfaces 136, 138, 140 of the base slot 134. With the side edge 212b of the second structural member 204 at least partly received within the base slot 134 of the fourth bracket clip assembly 100d, the second structural member 204 can be fixedly secured to the fourth bracket clip assembly 100d via the second fastener 190 of the fourth bracket clip assembly 100d. Thus, the position of the fourth bracket clip assembly 100d relative to the second structural member 204 can be easily adjusted by a user by loosening the second fastener 190 of the fourth bracket clip assembly 100d.

In some non-limiting examples, the fourth bracket clip assembly 100d can be configured to prevent or reduce rotation of the fourth bracket clip assembly 100d and the second structural member 204 relative to the third structural member 206. For example, in some non-limiting examples, a frictional surface can be disposed on one or more of the inner end 110 of the bracket base 102, the inner end 162 of the bracket cap 104, the outer surface of the base protrusion 130, or the outer surface of the cap protrusion 170 to prevent rotation of one or more components of the fourth bracket clip assembly 100d from rotating relative to the third structural member 206.

In the non-limiting illustrated example of FIG. 8, the fourth bracket clip assembly 100d is configured to secure each of the second and third structural members 204, 206 with the second structural member 206 being substantially perpendicular relative to the third structural member 206. In some non-limiting examples, the fourth bracket clip assembly 100d can be configured to secure the second structural member 206 obliquely relative to the third structural member 206. In some non-limiting examples, the fourth bracket clip assembly 100d can be configured such that the second structural member 204 can be selectively securable at a plurality of positions relative to the third structural member 206 by a user.

In some implementations, devices or systems disclosed herein can be utilized or configured for operation using methods embodying aspects of the invention. Correspondingly, description herein of particular features, capabilities, or intended purposes of a device or system is generally intended to inherently include disclosure of a method of using such features for the intended purposes, a method implementing such capabilities, and a method of configuring disclosed (or otherwise known) components to support these purposes or capabilities. Similarly, unless otherwise indicated or limited, discussion herein of any method of manufacturing or using a particular device or system, including configuring the device or system for operation, is intended to inherently include disclosure, as embodiments of the invention, of the utilized features and implemented capabilities of such device or system.

Correspondingly, some embodiments of the present disclosure can include a method for assembling a bracket clip assembly of a structural assembly (such as, e.g., the bracket clip assembly 100d of the structural assembly 200 of FIGS. 8 and 9). As one example, shown in FIG. 10, a method 300 can include step 310, which can include inserting a base protrusion of a bracket base and a cap protrusion of a bracket cap of a bracket clip assembly into an opening of a first structural member of a structural assembly. For example, with reference to the fourth bracket clip assembly 100d of the structural assembly 200 of FIGS. 8 and 9, step 310 of method 300 can include inserting the base protrusion 130 of the bracket base 102 and the cap protrusion 170 of the bracket cap 104 into opposing sides of the fourth panel opening 210d of the third structural member 206 of the structural assembly 200.

Figure 10:
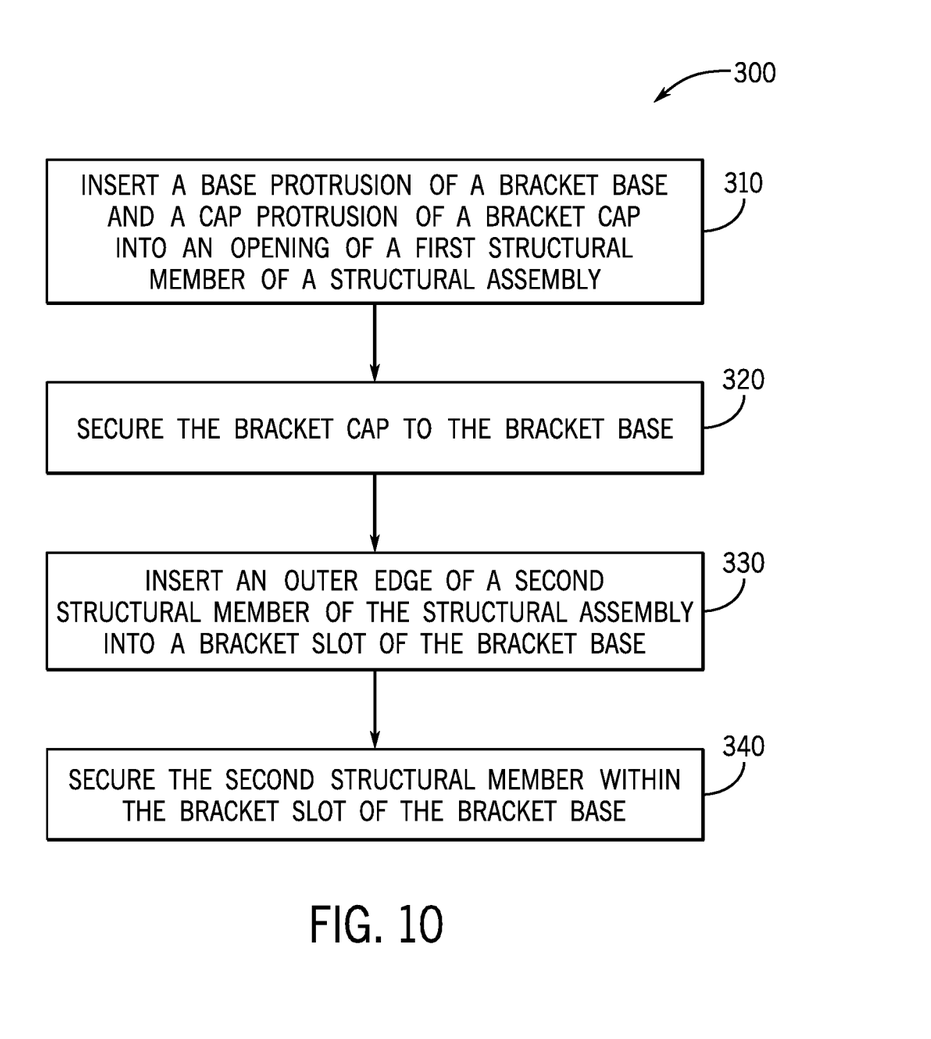
FIG. 10 illustrates a flowchart of an exemplary method for assembling a bracket clip assembly of a structural assembly according to some aspects of the present disclosure.

With the base protrusion of the bracket base and the cap protrusion of the bracket cap of the bracket clip assembly inserted into the opening of the first structural member of the structural assembly, as in step 310, method 300 can further include step 320, which can include securing the bracket cap to the bracket base of the bracket clip assembly. For example, with reference again to the fourth bracket clip assembly 100d of FIGS. 8 and 9, step 320 of method 300 can include securing the bracket clip 104 to the bracket base 102 via the first fastener 180 of the fourth bracket clip assembly 100d.

With the bracket cap secured to the bracket base of the bracket clip assembly, as in step 320, method 300 can further include step 330, which can include inserting an outer edge of a second structural member of the structural assembly into a bracket slot of the bracket base of the bracket clip assembly. For example, with reference to the fourth bracket clip assembly 100d of the structural assembly 200 of FIGS. 8 and 9, step 330 of method 300 can include slidably inserting the outer edge 212b of the second structural member 204 into the base slot 134 of the bracket base 102 of the fourth bracket clip assembly 100d.

With the outer edge of the second structural member of the structural assembly received within the bracket slot of the bracket base of the bracket clip assembly, as in step 330, method 300 can further include step 340, which can include securing the second structural member within the bracket slot of the bracket base of the bracket clip assembly. For example, with reference again to the fourth bracket clip assembly 100d of the structural assembly 200 of FIGS. 8 and 9, step 340 of method 300 can include securing the second structural member 204 of the structural assembly 200 within the base slot 134 of the bracket base 102 of the fourth bracket clip assembly 100d via the second fastener 190 of the fourth bracket clip assembly 100d.

Within this specification embodiments have been described in a way which enables a clear and concise specification to be written, but it is intended and will be appreciated that embodiments may be variously combined or separated without parting from the present disclosure. For example, it will be appreciated that all preferred features described herein are applicable to all aspects of the present disclosure described herein.

Thus, while the present disclosure has been described in connection with particular embodiments and examples, the present disclosure is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

I claim:

1. A bracket clip assembly, comprising:
   a bracket base having a first base end, a second base end opposite the first base end, and a base slot extending into the second base end toward the first base end that is configured to slidably receive a first structural member; and
   a bracket cap having a first cap end and a second cap end opposite the first cap end,
   wherein the second cap end of the bracket cap is configured to be removably secured to the first base end of the bracket base to secure a second structural member between the bracket base and the bracket cap, and
   wherein the base slot includes:
   a first slot surface disposed between the first and second base ends of the bracket base, the first slot surface being disposed closer to the first base end than the second base end;
   a second slot surface extending from the first slot surface to the second base end; and
   a third slot surface extending from the first slot surface to the second base end opposite the second slot surface.

2. The bracket clip assembly of claim 1, wherein the first base end of the bracket base is configured to threadably engage the second cap end of the bracket cap to removably secure the bracket cap to the bracket base.

3. The bracket clip assembly of claim 1, wherein the bracket base further includes a base protrusion extending outwardly from the first base end away from the second base end,
   wherein the bracket cap further includes a cap protrusion extending outwardly from the second cap end away from the first cap end, and
   wherein the cap protrusion of the second cap end of the bracket cap is removably secured to the base protrusion of the first base end of the bracket base.

4. The bracket clip assembly of claim 3, wherein the cap protrusion has a similar shape as the base protrusion.

5. The bracket clip assembly of claim 4, wherein the cap protrusion and the base protrusion are cylindrical shaped.

6. The bracket clip assembly of claim 5, wherein the cap protrusion and the base protrusion have equal diameters.

7. The bracket clip assembly of claim 1, wherein the first slot surface extends substantially parallel to at least the first base end of the bracket base.

8. The bracket clip assembly of claim 1, wherein the second and third slot surfaces are substantially parallel.

9. The bracket clip assembly of claim 1, wherein the bracket base includes a base opening that extends into the first slot surface and through the second base end,
   wherein the bracket cap includes a cap opening that extends into the second cap end toward the first cap end, and
   wherein the base opening and the cap opening are axially aligned.

10. The bracket clip assembly of claim 9, further comprising:
    a first fastener configured to be inserted into the base slot and to engage the base opening and the cap opening to secure the bracket cap to the bracket base.

11. The bracket clip assembly of claim 1, wherein the bracket base includes a base aperture that extends through a side of the bracket base between the first and second base ends and into the base slot.

12. The bracket clip assembly of claim 11, further comprising:
    a second fastener configured to engage the base aperture to secure the first structural member within the base slot of the bracket base.

13. A bracket clip assembly, comprising:
    a bracket base including:
    a first base end;
    a second base end opposite the first base end;
    a first base side extending between the first and second base ends;
    a second base side extending between the first and second base ends opposite the first base side;
    a base slot extending into the second base end toward the first base end and through at least one of the first and second base sides, the base slot being configured to slidably receive a first structural member; and a base protrusion extending outwardly from the first base end away from the second base end;

a bracket cap including:
  a first cap end;
  a second cap end opposite the first cap end; and
  a cap protrusion extending outwardly from the second cap end away from the first cap end, the cap protrusion being configured to be removably secured to the base protrusion of the bracket base;

a first fastener configured threadably engage the bracket base and the bracket cap to removably secure the bracket cap to the bracket base; and a second fastener configured to fixedly secure the first structural member within the base slot of the bracket base, wherein the base protrusion of the bracket base and the cap protrusion of the bracket cap are configured to secure a second structural member to the bracket clip assembly between the bracket base and the bracket cap.

14. The bracket clip assembly of claim 13, wherein the bracket base further includes a base opening extending through the base slot and the base protrusion, wherein the bracket cap further includes a cap opening extending into the cap protrusion toward the first cap end, and wherein the first fastener threadably engages the base opening of the bracket base and the cap opening of the bracket cap to removably secure the cap protrusion of the bracket cap to the base protrusion of the bracket base.

15. The bracket clip assembly of claim 13, wherein the cap protrusion and the base protrusion are cylindrical shaped and have an equal diameter.

16. The bracket clip assembly of claim 13, wherein the bracket base further includes a base aperture extending through the first base side and into the base slot, and wherein the second fastener threadably engages the base aperture of the bracket base to fixedly secure the first structural member within the base slot of the bracket base.

17. A method for assembling a bracket clip assembly of a structural assembly, the method comprising:

inserting a base protrusion of a bracket base of the bracket clip assembly and a cap protrusion of a bracket cap of the bracket clip assembly into opposing sides of an opening of a first structural member of the structural assembly, the base protrusion extending from a first base end of the bracket base;

securing the cap protrusion of the bracket cap to the base protrusion of the bracket base to secure the bracket clip assembly to the first structural member;

inserting an outer edge of a second structural member of the structural assembly into a bracket slot of the bracket base that extends into a second base end of the bracket base, opposite the first base end, and toward the first base end; and securing the second structural member of the structural assembly within the bracket slot of the bracket base with the outer edge of the second structural member being disposed closer to the first base end than the second base end of the bracket base.

18. The method of claim 17, wherein the bracket clip assembly secures the first structural member of the structural assembly substantially perpendicular relative to the second structural member of the structural assembly.

\* \* \* \* \*